United States Patent
La

(10) Patent No.: US 10,246,091 B2
(45) Date of Patent: Apr. 2, 2019

(54) REAR MONITORING FOR AUTOMOTIVE CRUISE CONTROL SYSTEMS

(71) Applicant: Robert Bosch GmbH, Stuttgart (DE)

(72) Inventor: Victor La, Kentwood, MI (US)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 15/180,654

(22) Filed: Jun. 13, 2016

(65) Prior Publication Data
US 2017/0355369 A1    Dec. 14, 2017

(51) Int. Cl.
| | | |
|---|---|---|
| B60W 30/14 | (2006.01) | |
| B60W 30/16 | (2012.01) | |
| B60W 30/18 | (2012.01) | |

(52) U.S. Cl.
CPC .......... *B60W 30/143* (2013.01); *B60W 30/16* (2013.01); *B60W 30/18072* (2013.01); *B60W 2420/42* (2013.01); *B60W 2420/52* (2013.01); *B60W 2540/04* (2013.01); *B60W 2550/14* (2013.01); *B60W 2550/142* (2013.01); *B60W 2550/146* (2013.01); *B60W 2550/22* (2013.01); *B60W 2550/308* (2013.01); *B60W 2550/402* (2013.01); *B60W 2550/406* (2013.01); *B60W 2710/0605* (2013.01); *B60W 2710/18* (2013.01)

(58) Field of Classification Search
None
See application file for complete search history.

(56) References Cited

U.S. PATENT DOCUMENTS

| | | |
|---|---|---|
| 6,161,074 A | 12/2000 | Sielagoski et al. |
| 7,440,835 B2 | 10/2008 | Shima |
| 7,966,118 B2 | 6/2011 | Kade |
| 9,229,457 B2 | 1/2016 | Huelsebusch et al. |
| 2002/0138190 A1 | 9/2002 | Hellmann et al. |
| 2013/0116089 A1 | 5/2013 | Wegner et al. |
| 2014/0371974 A1* | 12/2014 | Huelsebusch ...... B60K 31/0008 701/23 |
| 2015/0134224 A1 | 5/2015 | Vaughan |

FOREIGN PATENT DOCUMENTS

| | | |
|---|---|---|
| DE | 102014002111 A1 | 8/2015 |
| JP | 2010167994 A | 8/2010 |

\* cited by examiner

*Primary Examiner* — Rami Khatib
*Assistant Examiner* — Gerrad A Foster
(74) *Attorney, Agent, or Firm* — Michael Best & Friedrich LLP

(57) ABSTRACT

An system and method of operating an adaptive cruise control system for a vehicle. In one example, the system includes a rearward facing sensor, a speed control, and a controller. The controller receives at least one parameter indicative of a road condition or a traffic condition. The controller then activates a coasting mode based on the at least one parameter. The controller receives a signal from the rearward facing sensor indicative of a presence of a target vehicle positioned behind the host vehicle and restricts the coasting mode when the signal from the rearward facing sensor detects the target vehicle is positioned behind the host vehicle. The controller performs coasting via the speed control when the signal from the rearward facing sensor does not detect the target vehicle positioned behind the host vehicle and when the coasting mode is active.

20 Claims, 4 Drawing Sheets

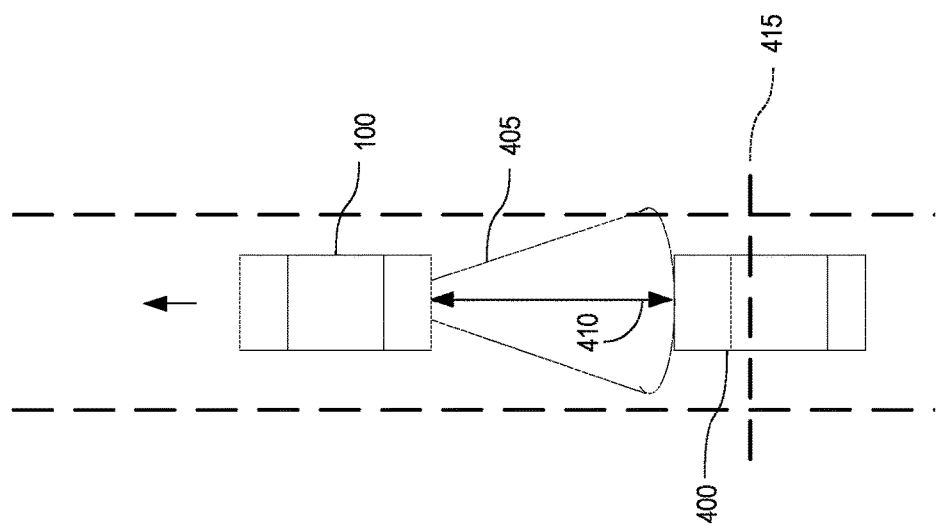
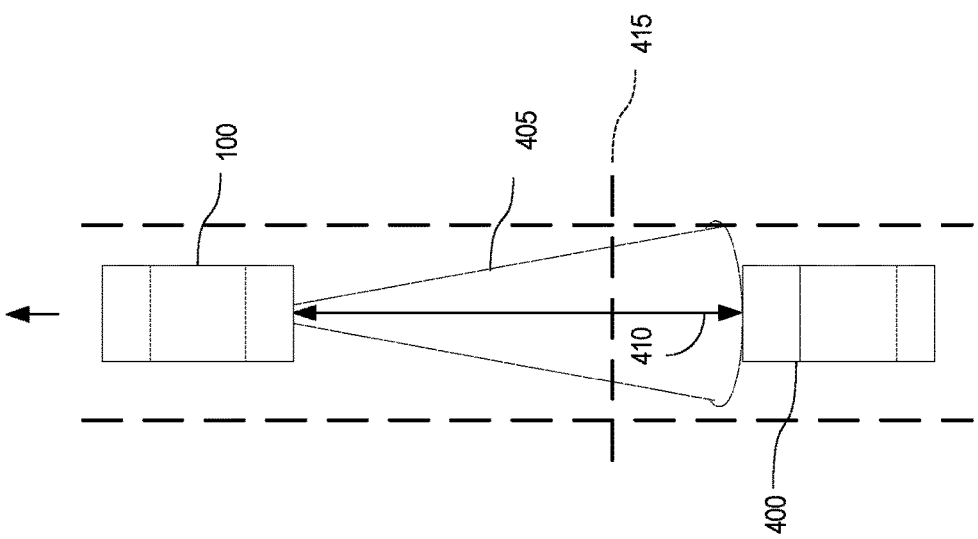

REAR MONITORING FOR AUTOMOTIVE CRUISE CONTROL SYSTEMS

FIELD

Embodiments relate to automotive cruise control systems.

BACKGROUND

Modern vehicles may have various types of automated controls to assist a driver of the vehicle. One type of automated vehicle control system is an adaptive cruise control system. Adaptive cruise control systems provide additional functionality over traditional cruise control systems. For example, an adaptive cruise control ("ACC") system may maintain a desired speed for the vehicle until the ACC system detects a vehicle travelling at a slower speed in front of the vehicle. An adaptive cruise control system may also adjust the speed of the vehicle based on changes or features of a roadway being traversed by the vehicle. However, in these examples, the adaptive cruise control systems adjust the speed without considering the effect on other vehicles on the roadway. In particular, changes in speed of the vehicle may be somewhat disruptive to traffic flow and other drivers.

SUMMARY

Embodiments provide, among other things, an adaptive cruise control system that adjusts the level of automated control based on rear monitoring of other vehicles with a rearward facing sensor positioned on the vehicle.

One embodiment provides an adaptive cruise control system for a vehicle. In this embodiment, the system includes a rearward facing sensor, a speed control, and a controller. The controller receives at least one parameter indicative of a road condition or a traffic condition. The controller then selects a coasting mode based on the at least one parameter. The coasting mode may be either active or inactive. The controller receives a signal from the rearward facing sensor indicative of a presence of a target vehicle positioned behind the host vehicle and restricts the coasting mode when the signal from the rearward facing sensor detects the target vehicle is positioned behind the host vehicle. Conversely, the controller performs coasting via the speed control when the signal from the rearward facing sensor does not detect the target vehicle positioned behind the host vehicle and when the coasting mode is active.

Another embodiment provides a method of operating the adaptive cruise control system for the vehicle. In this embodiment, the method includes receiving, by a controller, at least one parameter indicative of a road condition or a traffic condition. The controller selects a coasting mode based on the at least one parameter. The coasting mode may be either active or inactive. The controller receives a signal from a rearward facing sensor indicative of a presence of a target vehicle positioned behind the host vehicle and restricts the coasting mode when the signal from the rearward facing sensor detects that the target vehicle positioned behind the host vehicle. Conversely, the controller performs coasting when the signal from the rearward facing sensor does not detect the target vehicle positioned behind the host vehicle and when the coasting mode is active.

Other aspects and embodiments will become apparent by consideration of the detailed description and accompanying drawings.

BRIEF DESCRIPTION OF THE DRAWINGS

FIGS. 4 and 5 are block diagrams of traffic scenarios in which the adaptive cruise control system of FIG. 1 reacts differently based on distance or relative speed between the host vehicle and a target vehicle positioned behind the host vehicle according to one embodiment.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more processors, one or more memory modules including non-transitory computer-readable medium, one or more input/output interfaces, and various connections (for example, a system bus) connecting the components.

Figure 1:
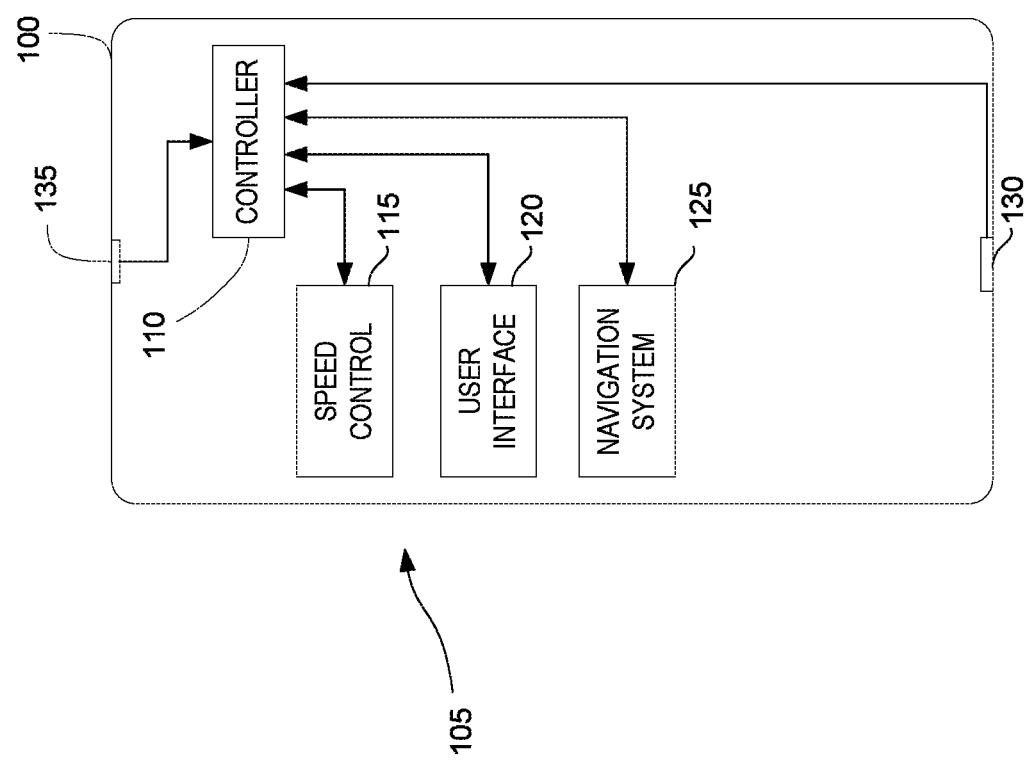
FIG. 1 is a block diagram of a host vehicle equipped with an adaptive cruise control system according to one embodiment.

FIG. 1 illustrates a host vehicle 100 equipped with an adaptive cruise control system 105 according to one embodiment. In the example illustrated, the adaptive cruise control system 105 is constructed of multiple components including a controller 110, a speed control 115, a user interface 120, a navigation system 125, a rearward facing sensor 130, and a front sensor 135. The controller 110 is communicatively coupled to the speed control 115, the user interface 120, the navigation system 125, the rearward facing sensor 130, and the front sensor 135 via various wired or wireless connections. For example, in some embodiments, the controller 110 is directly coupled via a dedicated wire to each of the above-listed components of the adaptive cruise control system 105. In other embodiments, the controller 110 is communicatively coupled to one or more of the components via a shared communication link such as a vehicle communication bus (for example, a controller area network (CAN) bus) or a vehicle network (for example, a wireless connection).

The components of the adaptive cruise control system 105 may be of various constructions and types. For example, in some embodiments, the speed control 115 may be an electronically controlled device (for example, a throttle) for controlling power delivered to an engine of the host vehicle 100. In some embodiments, the speed control 115 also includes automatic braking controls. In another example, the user interface 120 includes hardware and may also include software configured to provide a human machine interface (HMI). This may include buttons, panels, dials, lights, displays, and the like, which provide input and output functionality between the controller 110 and a driver of the host vehicle 100. The user interface 120 may include one or more selectable inputs (for example, buttons or selectable icons on a display) to change modes of operation of the host vehicle 100 including, for example, one or more inputs to activate and deactivate adaptive cruise control or to set a desired cruise control speed. The user interface 120 may also include an indicator (for example, a light, an icon, an audible alarm, haptic feedback, and the like) for providing various indications to a driver of the host vehicle 100.

In another example, the navigation system 125 includes additional input/output functionality for the adaptive cruise control system 105. The navigation system 125 may gather information via a global positioning system (GPS), a remote information server, an internal database, and the like. The information may include road conditions, traffic conditions, or both. For example, information about current and upcoming road conditions and traffic conditions may be generated externally or internally for the controller 110. The road conditions may include upcoming declining or inclining road slope, an upcoming curve in the road, an upcoming decrease or increase in a speed limit, and the like.

The controller 110 uses the road conditions and the traffic conditions, at least in part, to determine when to enable a coasting mode of operation (hereafter "coasting mode"). In one example, road slope information allows the controller 110 to predict upcoming changes in a pitch angle of the host vehicle 100 based on the upcoming road slope. Road curve information allows the controller 110 to predict upcoming changes in a yaw angle and lateral acceleration of the host vehicle 100. As a consequence, the road conditions enable the controller 110 to predict future power requirements for the host vehicle 100. For example, the controller 110 may predict the power output to the engine necessary to maintain a range of speed set by the adaptive cruise control system 105 based on the road conditions. Accordingly, the controller 110 may determine when the host vehicle 100 will require less power and enable, activate, or transition to the coasting mode in anticipation of and to take advantage of the upcoming reduction in power. When the coasting mode is enabled or activated, the controller 110 may remove or reduce power output to the engine. However, even when the coasting mode is enabled, in some embodiments, the controller 110, based on information received from the rearward facing sensor 130, adjusts the timing of coasting (for example, the duration of coasting), the amount of coasting (for example, an allowable speed range), and deactivation of coasting as discussed in more detail below. As a consequence, the controller 110 may reduce power consumption of the vehicle where appropriate to save fuel.

In yet another example, the rearward facing sensor 130 may be mounted on a rear of the host vehicle 100 and be positioned with a field-of-view facing rearward from the host vehicle 100. In one example, the rearward facing sensor 130 may be externally mounted to a frame of the host vehicle 100. In another example, the rearward facing sensor 130 may be internally mounted within the host vehicle 100. In other embodiments, the rearward facing sensor 130 may be mounted on a side of the host vehicle (for example, on a side mirror) and directed towards the rear of the host vehicle 100. In some embodiments, the rearward facing sensor 130 includes radio detection and ranging (RADAR) or light detection and ranging (LIDAR) components and functionality. In other embodiments, the rearward facing sensor 130 may include ultrasonic detection and functionality. In these embodiments, the rearward facing sensor 130 and the front sensor 135 are configured to transmit signals from the host vehicle 100 and to receive reflected signals indicative of a distance and a relative speed between the host vehicle 100 and a target vehicle (illustrated in FIG. 4). In yet other embodiments, the rearward facing sensor 130 receives transmissions (for example, radio frequency signals) from other vehicles indicative of distance, relative speed, location, and the like of the other vehicles rather than actively sensing these parameters. For example, in these embodiments, the "rearward facing sensor" may use vehicle-to-vehicle (V2V) technology to obtain at least some of the parameters used in the methods and systems described herein. In yet other embodiments, the rearward facing sensor 130 is a camera configured to capture images of other vehicles located behind the host vehicle 100. In these embodiments, various image or video processing equipment may determine distance, relative speed, location, and the like of other vehicles located behind the host vehicle 100. Similarly, the front sensor 135 may include one or more of the technologies described above with reference to the rear sensor 130.

Each of the above-listed components of the adaptive cruise control system 105 may include dedicated processing circuitry including an electronic processor and memory for receiving, processing, and transmitting data. Each of the components of the adaptive cruise control system 105 may communicate with the controller 110 using a predetermined communication protocol. The embodiment illustrated in FIG. 1 provides but one example of the components and connections of the adaptive cruise control system 105. However, these components and connections may be constructed in other ways than those illustrated and described herein.

Figure 2:
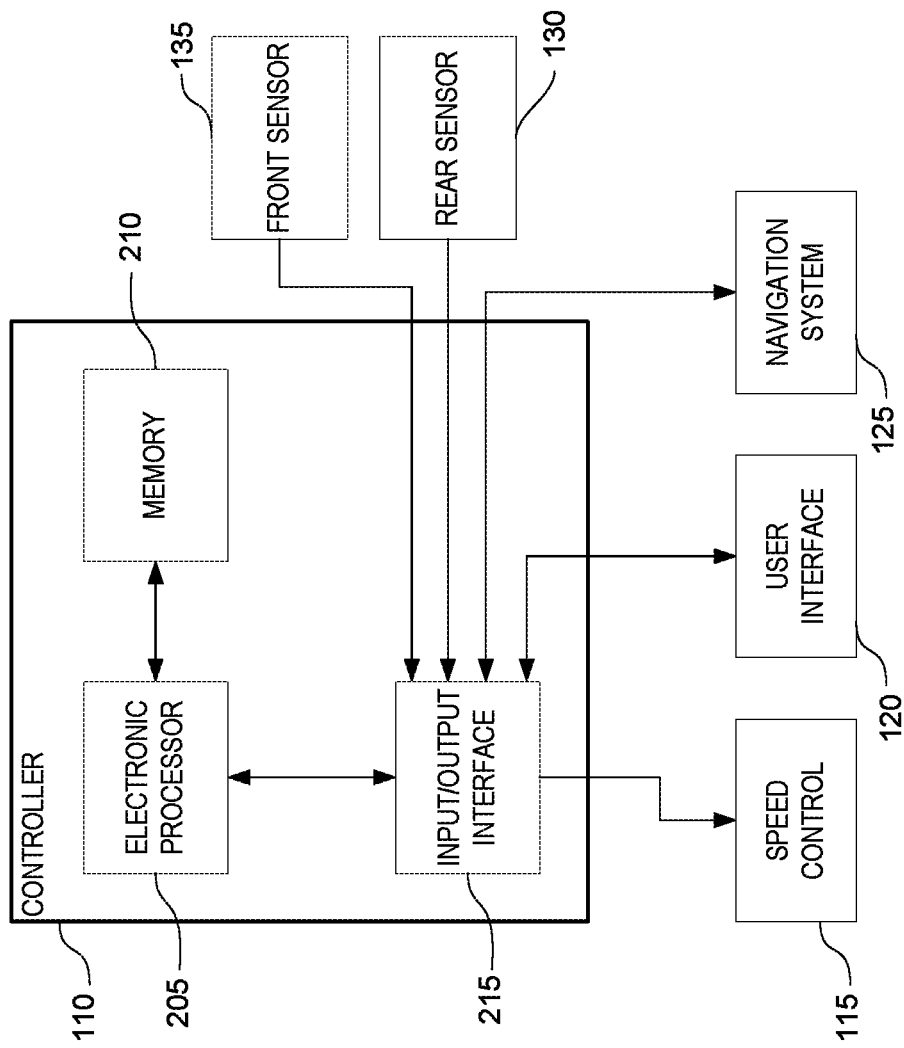
FIG. 2 is a block diagram of a controller of the adaptive cruise control system of FIG. 1 according to one embodiment.

FIG. 2 is a block diagram of the controller 110 of the adaptive cruise control system 105 according to one embodiment. The controller 110 includes a plurality of electrical and electronic components that provide power, operation control, and protection to the components and modules within the controller 110. The controller 110 includes, among other things, an electronic processor 205 (such as a programmable electronic microprocessor, microcontroller, or similar device), a memory 210 (for example, non-transitory, machine readable memory), and an input/output interface 215. In other embodiments, the controller 110 includes additional, fewer, or different components. The controller 110 may be implemented in several independent controllers (for example, programmable electronic control units) each configured to perform specific functions or sub-functions. Additionally, the controller 110 may contain sub-modules that include additional electronic processors, memory, or application specific integrated circuits (ASICs) for handling input/output functions, processing of signals, and application of the methods listed below.

The controller 110 and associated systems are configured to implement, among other things, processes and methods described herein. For example, the electronic processor 205 is communicatively coupled to the memory 210 and executes instructions which are capable of being stored on the memory 210. The electronic processor 205 is configured to retrieve from memory 210 and execute instructions related the methods of operation of the adaptive cruise control system 105. In some embodiments, the input/output interface 215 includes drivers, relays, switches, and the like to operate the speed control 115 based on instructions from the electronic processor 205. In some embodiments, the input/output interface 215 communicates with other vehicle controllers or systems by means of a protocol such as J1939 or CAN bus. In other embodiments, the input/output interface 215 communicates under other suitable protocols depending on the needs of the specific application.

Figure 3:
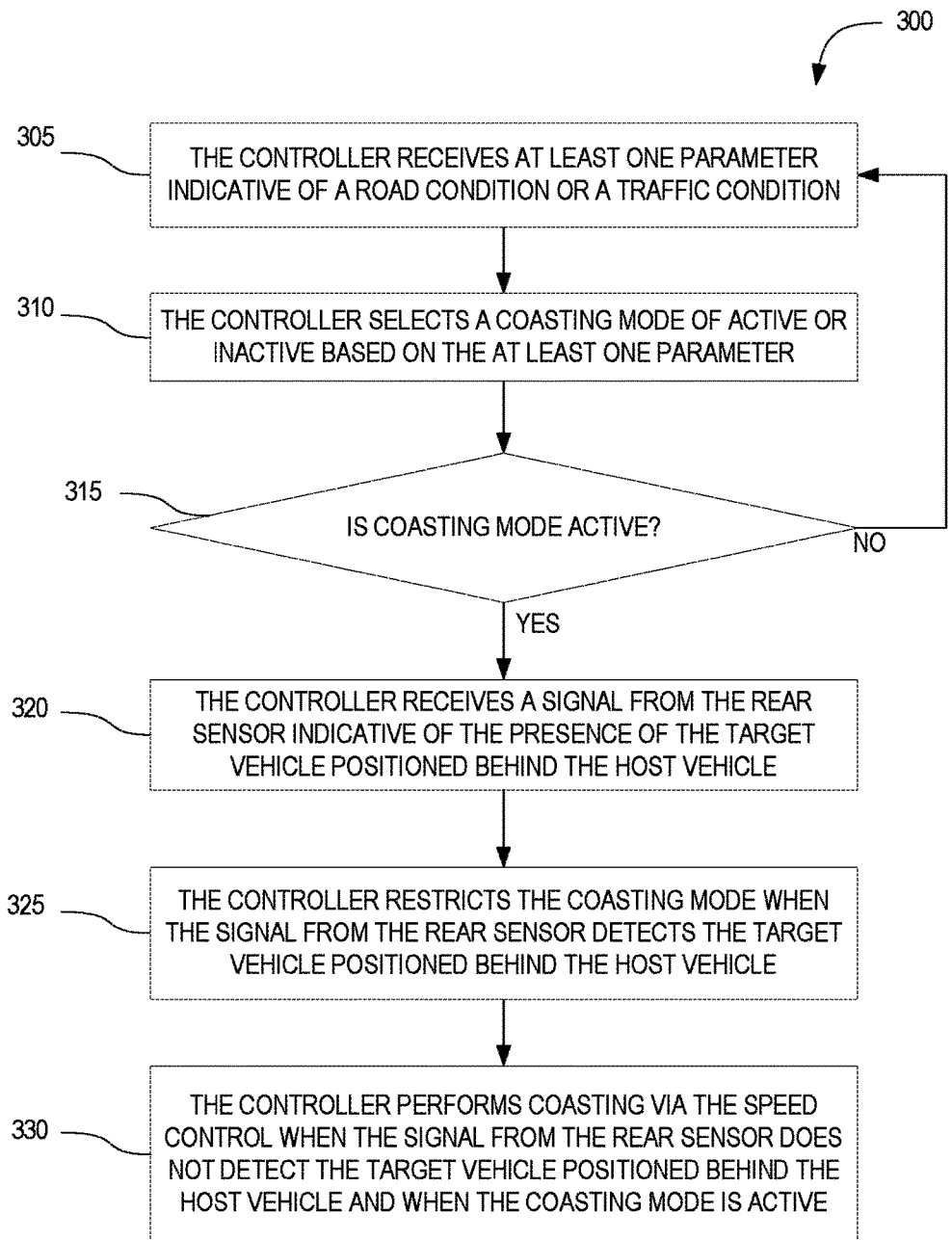
FIG. 3 is a flowchart of a method of operating the host vehicle with the adaptive cruise control system of FIG. 1 according to one embodiment.

FIG. 3 illustrates a flowchart of a method 300 of operating the host vehicle 100 with the adaptive cruise control system 105 according to one embodiment. The method 300 includes receiving at least one parameter indicative of a road condition or a traffic condition (block 305). As described above, the at least one parameter may be generated by the navigation system 125 based on a current location of the host vehicle 100. In some embodiments, the at least one parameter is sensed, at least in part, by the front sensor 135. For example, the front sensor 135 may generate road slope information, road curvature information, traffic condition information, or any combination of the foregoing. In some embodiments, the road conditions and traffic conditions may be sensed or otherwise determined by the navigation system 125 and the front sensor 135 acting alone or in combination. Based on the at least one parameter, the controller 110 sets a coasting mode of the adaptive cruise control system 105 to active or inactive (block 310). The controller 110 receives a signal from the rearward facing sensor 130 indicative of the presence, or lack thereof, of a target vehicle positioned behind the host vehicle 100 (block 315). When the signal from the rearward facing sensor 130 detects the target vehicle, the controller 110 may restrict the coasting mode (block 325). Conversely, when the signal from the rearward facing sensor 130 does not detect a target vehicle and when the coasting mode is active, the controller 110 performs coasting via the speed control 115 without restriction (block 330). In some embodiments, more than just the detection of the target vehicle occurs before the controller 110 restricts the coasting mode. For example, detection of a particular distance or speed of the target vehicle may be necessary before any restriction is applied by the controller 110, as discussed below.

The order of the steps of the method 300 is not critical to the performance of the method 300. The steps of the method 300 may be performed in orders other than those illustrated or the steps may be performed simultaneously. In addition, the steps of the method 300 may be performed rapidly and in repetition. For example, particular steps of the method 300 may be continuously performed during general operation of the host vehicle 100 or only while the adaptive cruise control system 105 is active.

FIGS. 4 and 5 illustrate driving scenarios in which adaptive cruise control is actively being performed by the controller 110. In the examples illustrated, a target vehicle 400 is positioned behind and in a same lane as the host vehicle 100. The rearward facing sensor 130 has a range 405 that extends rearward from the host vehicle 100. The controller 110 receives the signal from the rearward facing sensor 130 indicative of the presence of the target vehicle 400. As described in block 325 of method 300, the controller 110 restricts the coasting mode when the signal from the rearward facing sensor 130 detects a target vehicle positioned behind the host vehicle 100. Restricting the coasting mode may be performed in various ways. For example, in some embodiments, when the rearward facing sensor 130 detects the presence of the target vehicle 400, the controller 110 restricts the coasting mode of the adaptive cruise control system 105. In other embodiments, the controller 110 restricts the coasting mode based on detection of the target vehicle 400 only when certain additional conditions occur.

In some embodiments, the controller 110 determines a distance 410 between the host vehicle 100 and the target vehicle 400 based on the signal from the rearward facing sensor 130. As illustrated in FIG. 4, when the distance 410 is greater than a predetermined distance threshold 415, the controller 110 classifies the target vehicle 400 as "far" from the host vehicle 100. Conversely, as illustrated in FIG. 5, when the target vehicle 400 is less than the predetermined distance threshold 415 (for example, the predetermined distance threshold may be approximately 3 car lengths), the controller 110 classifies the target vehicle 400 as "near" to the host vehicle 100. In other words, the target vehicle 400 is "near" to the host vehicle 100 when the target vehicle 400 is close enough to the host vehicle 100 such that activation of coasting by the host vehicle 100 will require sudden braking by the target vehicle 400. Based on the classification of the distance 410, the controller 110 may adjust the adaptive cruise control system 105 by activating coasting, deactivating coasting, or allowing coasting within predefined limits.

In some cases, restricting the coasting mode based on the distance 410 includes disabling coasting mode. In such cases, whenever the target vehicle 400 is "near" to the host vehicle 100, the controller 110 ceases to perform coasting mode at least until the target vehicle 400 is no longer classified as "near" to the host vehicle 100. In other embodiments, the controller 110 ceases to perform coasting as soon as the target vehicle 400 is detected by the rearward facing sensor 130. This may occur even when the controller 110 classifies the target vehicle 400 as "far" from the host vehicle 100.

In other embodiments, the controller 110 restricts the coasting mode by setting predefined limits to the coasting mode. This may occur when the target vehicle is "near" to or "far" from the host vehicle 100. For example, the controller 110 may have a first set of predefined limits when the target vehicle 400 is "near" to the host vehicle 100 and a second set of predefined limits when the target vehicle 400 is "far" from the host vehicle 100. In this case, the first set of predefined limits may restrict coasting more than the second set of predefined limits.

The predefined limits may influence the behavior of the adaptive cruise control system 105 in various ways. For example, the controller 110 may set the predefined limits by setting a minimum speed of the host vehicle 100. The minimum speed may be based on the road conditions or the traffic information. As a consequence, the minimum speed sets a limit on the amount of coasting that is available. For example, when the host vehicle 100 slows from coasting to the minimum speed, the controller 110 maintains the host vehicle 100 at the minimum speed via the speed control 115 by providing some power to the engine of the host vehicle 100.

The predefined limits may also restrict a period of time available for coasting or of initialization of coasting. For example, the controller 110 may restrict coasting by performing coasting for shorter periods of time or may delay initialization of the coasting mode. For example, when the host vehicle 100 is approaching a downhill slope (for example, just prior to cresting a hill) and when coasting mode is enabled, the controller 110 may anticipate an upcoming reduction in power to the engine. In this example, when no target vehicle 400 is detected, the controller 110 may set the host vehicle 100 to coast without restriction.

However, when the target vehicle 400 is "near" to the host vehicle 100, the controller 110 may activate the coasting mode later in time or for a shorter period of time based on the first set of predefined limits. Similarly, when the target vehicle 400 is classified as "far" from the host vehicle 100, the controller 110 may activate the coasting mode later in time or for a shorter period of time based on the second set of predefined limits.

In some embodiments, the controller 110 may also restrict the coasting mode based on a relative speed between the host vehicle 100 and the target vehicle 400. In these embodiments, the controller 110 determines a speed of the target vehicle 400 relative to the host vehicle 100 based on the signal received from the rearward facing sensor 130. This may include simply determining whether the distance 410 is increasing or decreasing. Based on the determination, the controller 110 may classify the target vehicle 400 as "approaching," "receding," or "constant." To classify the target vehicle 400, the controller 110 may compare the relative speed of the target vehicle 400 to a predetermined speed threshold (not shown). For example, the controller 110 may classify the target vehicle 400 as "approaching" when the relative speed is greater than the predetermined speed threshold, as "receding" when the relative speed is lower than the predetermined speed threshold, and as "constant" when the relative speed is approximately zero (for example, less than 1 miles per hour). In some embodiments, the controller 110 may classify the target vehicle 400 as "fast approaching" (for example, approaching the host vehicle 100 at greater than 5 miles per hour).

Similar to adjusting the adaptive cruise control system 105 based on distance classifications, the controller 110 may adjust the adaptive cruise control system 105 by activating coasting, deactivating coasting, or allowing coasting within predefined limits based on speed classifications.

In some cases, restricting the coasting mode based on the relative speed of the target vehicle 400 includes disabling coasting mode. In such cases, whenever the target vehicle 400 is "approaching" the host vehicle 100, the controller 110 ceases to perform coasting mode at least until the target vehicle 400 is no longer classified as "approaching" the host vehicle 100 (for example, when the target vehicle 400 changes lanes). In other embodiments, the controller 110 ceases to perform coasting when the target vehicle 400 is classified as "constant" or only when the target vehicle 400 is classified as "fast approaching."

In some embodiments, the controller 110 restricts the coasting mode by setting predefined limits to the coasting mode based on the relative speed. This may occur when the target vehicle 400 is "approaching," "fast approaching," or "constant" from the host vehicle 100. For example, the controller 110 may have a first set of predefined limits when the target vehicle 400 is "approaching" the host vehicle 100 and a second set of predefined limits when the target vehicle 400 is "constant" from the host vehicle 100. In this case, the first set of predefined limits may restrict coasting more than the second set of predefined limits. In addition, the host vehicle 100 may have a third set of predefined limits when the target vehicle 400 is "fast approaching" that would restrict coasting more than either the first set of predefined limits or the second set of predefined limits. Similar to the above, the controller 110 may restrict coasting by performing coasting for shorter periods of time or may delay initialization of the coasting mode.

The controller 110 may also adjust the adaptive cruise control system 105 based on both the distance 410 and the relative speed of the target vehicle 400. In this case, the controller 110 may only disable the coasting mode when the target vehicle 400 is classified as both "near" and "approaching." In addition, the controller 110 may set predefined limits to the coasting mode based on the combination of the distance 410 and the relative speed of the target vehicle 400. For example, the controller 110 may combine the distance 410 and the relative speed of the target vehicle 400 into a risk assessment value. In this case, when the risk assessment value is greater than a first risk threshold, the controller 110 may set predefined limits and when the risk assessment value is greater than a second risk threshold, the controller 110 may disable coasting.

In some embodiments, the controller 110 may adjust the predefined limits of the coasting mode over a relatively continuous range based on the risk assessment value. In these embodiments, the controller 110 gradually reduces the predefined limits as the risk assessment value increases.

Thus, embodiments provide, among other things, an adaptive cruise control system for a host vehicle and a method of operating a host vehicle equipped with the adaptive cruise control system that adjusts operation of the adaptive cruise control system based on vehicles detected by a rearward facing sensor of the host vehicle. Various features and advantages of the invention are set forth in the following claims.

What is claimed is:

1. An adaptive cruise control system for a host vehicle, the system comprising:
    a rearward facing sensor;
    a speed control; and
    a controller including an electronic processor, the controller communicatively coupled to the rearward facing sensor and the speed control, the controller configured to
        receive at least one parameter indicative of at least one from the group consisting of a road condition and a traffic condition;
        activate a coasting mode based on the at least one parameter;
        receive a signal from the rearward facing sensor indicative of a presence of a target vehicle positioned behind the host vehicle;
        restrict the coasting mode when the signal from the rearward facing sensor detects the target vehicle positioned behind the host vehicle, wherein restricting the coasting mode includes disabling the coasting mode; and
        perform coasting via the speed control when the signal from the rearward facing sensor does not detect the target vehicle positioned behind the host vehicle and when the coasting mode is active.

2. The adaptive cruise control system of claim 1, wherein the controller is further configured to determine a distance between the host vehicle and the target vehicle and to classify the target vehicle as at least one from the group consisting of near to the host vehicle and far from the host vehicle based on a predetermined distance threshold.

3. The adaptive cruise control system of claim 2, wherein the controller is configured to disable the coasting mode when the target vehicle is classified as near to the host vehicle.

4. The adaptive cruise control system of claim 2, wherein the controller is configured to restrict the coasting mode by further enabling coasting within a predefined limit when the target vehicle is classified as far from the host vehicle.

5. The adaptive cruise control system of claim 4, wherein the controller is configured to enable coasting within the predefined limit by setting a minimum speed as the predefined limit.

6. The adaptive cruise control system of claim 1, wherein the controller is further configured to determine a speed of the target vehicle relative to the host vehicle and to classify the target vehicle as at least one from the group consisting of approaching the host vehicle and receding from the host vehicle based on a predetermined speed threshold.

7. The adaptive cruise control system of claim 6, wherein the controller is configured to disable the coasting mode when the target vehicle is classified as approaching the host vehicle.

8. The adaptive cruise control system of claim 6, wherein the controller is configured to restrict the coasting mode by further enabling coasting within a predefined limit when the target vehicle is classified as receding from the host vehicle.

9. The adaptive cruise control system of claim 1, further comprising a user interface, and wherein the controller is further configured to receive a signal from the user interface indicative of a mode of operation of the adaptive cruise control system.

10. The adaptive cruise control system of claim 1, wherein the controller is configured to activate the coasting mode when the at least one parameter indicates at least one consisting of an upcoming declining road slope, an upcoming curve in the road, and an upcoming decrease in a speed limit.

11. A method of adaptively controlling a host vehicle, the method comprising:
receiving, with a controller, at least one parameter indicative of at least one from the group consisting of a road condition and a traffic condition;
activating, with the controller, a coasting mode based on the at least one parameter, the coasting mode being either active or inactive;
receiving, with the controller, a signal from a rearward facing sensor indicative of a presence of a target vehicle positioned behind the host vehicle;
restricting, with the controller, the coasting mode when the signal from the rearward facing sensor detects the target vehicle positioned behind the host vehicle, wherein restricting the coasting mode includes disabling the coasting mode; and
performing, with the controller, coasting when the signal from the rearward facing sensor does not detect the target vehicle positioned behind the host vehicle and when the coasting mode is active.

12. The method of adaptively controlling the host vehicle of claim 11, the method further comprising determining a distance between the host vehicle and the target vehicle and classifying the target vehicle as at least one from the group consisting of near to the host vehicle and far from the host vehicle based on a predetermined distance threshold.

13. The method of adaptively controlling the host vehicle of claim 12, wherein the coasting mode is disabled when the target vehicle is classified as near to the host vehicle.

14. The method of adaptively controlling the host vehicle of claim 12, wherein restricting the coasting mode further includes enabling coasting within a predefined limit when the target vehicle is classified as far from the host vehicle.

15. The method of adaptively controlling the host vehicle of claim 14, wherein enabling coasting within the predefined limit by setting a minimum speed as the predefined limit.

16. The method of adaptively controlling the host vehicle of claim 11, the method further comprising determining a speed of the target vehicle relative to the host vehicle and classifying the target vehicle as at least one from the group consisting of approaching the host vehicle and receding from the host vehicle based on a predetermined speed threshold.

17. The method of adaptively controlling the host vehicle of claim 16, wherein the coasting mode is disabled when the target vehicle is classified as approaching the host vehicle.

18. The method of adaptively controlling the host vehicle of claim 16, wherein restricting the coasting mode further includes enabling coasting within a predefined limit when the target vehicle is classified as receding from the host vehicle.

19. The method of adaptively controlling the host vehicle of claim 11, the method further comprising receiving a signal from a user interface indicative of a mode of operation of the host vehicle.

20. The method of adaptively controlling the host vehicle of claim 11, wherein setting the activating the coasting mode occurs when the at least one parameter indicates at least one consisting of an upcoming declining road slope, an upcoming curve in the road, and an upcoming decrease in a speed limit.

* * * * *